United States Patent
Yano et al.

(10) Patent No.: US 8,895,639 B2
(45) Date of Patent: Nov. 25, 2014

(54) INK SET, INK JET RECORDING APPARATUS, AND RECORDED ARTICLE

(71) Applicant: Seiko Epson Corporation, Tokyo (JP)

(72) Inventors: Takeshi Yano, Shiojiri (JP); Tetsuya Aoyama, Shiojiri (JP); Shoki Kasahara, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/709,359

(22) Filed: Dec. 10, 2012

(65) Prior Publication Data

US 2013/0149505 A1 Jun. 13, 2013

(30) Foreign Application Priority Data

Dec. 13, 2011 (JP) ................. 2011-272132

(51) Int. Cl.
| | | |
|---|---|---|
| B41J 2/01 | (2006.01) | |
| B41J 2/17 | (2006.01) | |
| B41J 2/175 | (2006.01) | |
| C09D 5/00 | (2006.01) | |
| C09D 11/00 | (2014.01) | |
| G01D 11/00 | (2006.01) | |
| C09D 7/12 | (2006.01) | |

(52) U.S. Cl.
CPC .................... C09D 7/1241 (2013.01)
USPC ..................... 523/160; 106/31.13; 106/31.28; 106/31.57; 106/31.59; 106/31.6; 106/31.85; 106/31.89; 347/1; 347/85; 347/95; 347/100; 523/161

(58) Field of Classification Search
USPC .................. 347/1, 85, 95, 100; 523/160, 161; 106/31.13, 31.28, 31.57, 31.59, 31.6, 106/31.85, 31.89
See application file for complete search history.

(56) References Cited

U.S. PATENT DOCUMENTS

| | | | |
|---|---|---|---|
| 7,553,883 B2 * | 6/2009 | Yatake ........................ | 523/160 |
| 2007/0064073 A1 * | 3/2007 | Ryu et al. .................... | 347/100 |
| 2011/0193912 A1 | 8/2011 | Sakai et al. | |
| 2011/0205288 A1 | 8/2011 | Matsuyama et al. | |
| 2012/0121831 A1 | 5/2012 | Kudoh et al. | |
| 2012/0156449 A1 | 6/2012 | Tateishi et al. | |

FOREIGN PATENT DOCUMENTS

| | | |
|---|---|---|
| JP | 2009-235155 | 10/2009 |
| JP | 2011-127043 | 6/2011 |
| JP | 2011-162692 | 8/2011 |
| WO | 2010-050618 | 5/2010 |
| WO | 2011-007888 | 1/2011 |
| WO | 2011-027842 | 3/2011 |

* cited by examiner

*Primary Examiner* — Patrick Niland
(74) *Attorney, Agent, or Firm* — Harness, Dickey & Pierce, P.L.C.

(57) ABSTRACT

An ink set is provided which includes a first ink containing a first pigment, water, and a glycol ether having an HLB value, measured by Davies method, in the range of 4.2 to 8.0, and a second ink substantially not containing the glycol ether. The second ink contains a second pigment and water.

7 Claims, No Drawings

INK SET, INK JET RECORDING APPARATUS, AND RECORDED ARTICLE

Priority is claimed under 35 U.S.C. §119 to Japanese Application No. 2011-272132 filed on Dec. 13, 2011, is hereby incorporated by reference in its entirety.

BACKGROUND

1. Technical Field

The present invention relates to an ink set, and to an ink jet recording apparatus and a recorded article that use the ink set.

2. Related Art

An ink jet recording method is a technique for printing, and in which printing is performed by ejecting ink droplets so as to be deposited on a recording medium, such as a paper sheet. The ink jet recording method is being innovatively developed and increasingly applied to the application of high-resolution image recording (printing) which has been performed by photo printing and offset printing. Accordingly, it is desired that high-quality images be recorded not only on general plain paper and ink jet recording paper (matte paper, glossy paper), but also on other recording media, such as book printing paper, synthetic paper, and films.

Dyes and pigments are used as coloring agents, and, in particular, water-soluble dyes are often used in color inks because of their chromaticness, transparency, solubility in water and other properties. However, water-soluble dyes are generally inferior in light fastness and gas fastness. In addition, their water fastness is not good because water-soluble dyes are soluble in water. Accordingly, recorded articles produced with an ink containing a water-soluble dye are inferior in storage. In contrast, coloring agents insoluble in water are advantageous in terms of water fastness. Among coloring agents insoluble in water are pigments. Pigments are superior in light fastness, gas fastness, and water fastness. Accordingly, pigment inks exhibiting such properties of the pigment are being developed.

On the other hand, aqueous pigment inks for ink jet recording are simultaneously required to have high color developability and glossiness, to exhibit a small degree of bleeding and such an ejection stability as ejection from head nozzles does not veer, and to be stored stably.

However, if the pigment content in an ink is increased to enhance the color developability, the viscosity of the ink is increased, and the anti-clogging properties, ejection stability, and storage stability of the ink are degraded. In addition, if the penetration of the ink is enhanced in order to prevent bleeding or increase printing speed, the ink undesirably penetrates into the recording medium and is thus unlikely to remain on the surface of the recording medium. This causes the degradation of the uniformity and color developability of images filled with a solid color.

Accordingly, in order to enhance printing quality (color developability, anti-bleeding properties, uniformity of solid color area) and reliability (storage stability, printing stability), JP-A-2009-235155 proposes that a glycol ether having a hydrophile-lipophile balance (HLB) value, measured by Davies method, of 4.2 to 8.0 and an 1,2-alkanediol be added to an ink.

This technique, however, degrades the storage stability of some of the known inks, depending on the combination of the coloring material (type of pigment) and glycol ether used in the ink. Also, the quality of images printed on non-absorbent recording media, such as films, has not been studied.

SUMMARY

An advantage of some aspects of the invention is that it provides an ink set including an ink that is suitable for an ink jet recording method and contains a pigment and a glycol ether in such a combination as will enhance the storage stability, and that can form high-quality printed images including uniform solid color areas on various recording media, particularly on films, without being repelled from the recording media.

The present invention has been made to solve at least part of the above issues, and the following embodiments, or applications, of the invention can be provided.

Application 1

According to an aspect of the invention, an ink set is provided which includes a first ink containing a first pigment, water, and a glycol ether having an HLB value, measured by Davies method, in the range of 4.2 to 8.0, and a second ink substantially not containing the glycol ether and containing a second pigment and water.

In the ink set, whether or not the inks contain a glycol ether is determined depending on the type of pigment so that the storage stability of the inks is not affected by the glycol ether. Thus, the storage stability of the ink can be prevented from being degraded.

Application 2

The second ink may further contain at least one surfactant selected from the group consisting of fluorochemical surfactants and polyether siloxane-based surfactants.

The second ink containing such a surfactant can produce a high-quality printed image including a uniform solid color area without being repelled from recording media, particularly from film-type media.

Application 3

The first ink may also further contain at least one surfactant selected from the group consisting of fluorochemical surfactants and polyether siloxane-based surfactants.

The first ink containing such a surfactant can produce a high-quality printed image including a uniform solid color area without being repelled from recording media, particularly from film-type media.

Application 4

The surfactant content in the second ink may be larger than the surfactant content in the first ink.

By adding such an amount of at least one of fluorochemical surfactants and polyether siloxane-based surfactants to the second ink, which does not contain glycol ether, high-quality printed images including uniform solid color areas can be formed on recording media, particularly on film-type media, without repelling the ink from the recording media.

Application 5

The first ink may further contain a 1,2-alkanediol having a carbon number in the range of 4 to 7 in a mass ratio of 2/1 to 16/1 to the glycol ether.

By adding 1,2-alkanediol in such a ratio to the first ink, the solubility of the glycol ether in the ink can be increased, and accordingly, the storage stability and ejection stability of the ink can be enhanced.

Application 6

The first pigment may be selected from the group consisting of phthalocyanine pigments, perinone pigments, disazo pigments, monoazo pigments, quinoxaline pigments, and black pigments.

Since such a first pigment is resistant to solvents, the first ink can ensure high storage stability even if the first ink contains the glycol ether.

Application 7

The second pigment may be selected from the group consisting of quinacridone pigments, benzimidazolone pigments, and titanium-based pigments.

Since such a second pigment exhibits low resistance to solvents, the second ink does not contain glycol ether so as to ensure storage stability.

Application 8

According to another aspect of the invention, an ink jet recording apparatus is provided which records images using the above-described ink set.

The ink jet recording apparatus can record high-quality images including uniform solid color areas on various recording media, particularly on film-type recording media, without repelling the inks.

Application 9

According to another aspect of the invention, a recorded article produced with the ink jet recording apparatus is provided.

The recorded article has a recorded image including a uniform solid color area.

DESCRIPTION OF EXEMPLARY EMBODIMENTS

Embodiments of the ink set according to the invention will now be described in detail.

1. First Ink

The first ink contains at least a first pigment, water, and a glycol ether having an HLB (Hydrophile-Lipophile Balance) value, measured by Davies method, in the range of 4.2 to 8.0.

First Pigment

The first pigment in the first ink will be described below. The first pigment has an affinity with the glycol ether described later, and is capable of dispersing well.

When the first ink is a black ink, the pigment may be carbon black or lignin black.

Organic pigments for yellow inks include C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185 and 213.

Organic pigments for magenta inks include C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254 and 264, and C. I. Pigment Violets 19, 23, 32, 33, 36, 38, 43 and 50.

Organic pigments for cyan inks include C. I. Pigment Blues 1, 2, 3, 15, 15:1, 15:2, 15:3, 15:4, 15:6, 15:34, 16, 18, 22, 25, 60, 65 and 66, and C. I. Vat Blues 4 and 60.

Organic pigments for colors other than magenta, cyan and yellow include C. I. Pigment Greens 7 and 10, C. I. Pigment Browns 3, 5, 25 and 26, C. I. Pigment Oranges 2, 5, 7, 13, 14, 15, 16, 24, 34, 36, 38, 40, 43 and 63, and C. I. Pigment Whites 4, 6, 6:1, 7, 18 and 26. Also, pigments expressed by General Formula (1) of International Publication No. 2011/027842 and pigments expressed by General Formula (1) of JP-A-2011-127043 can be used.

More specifically, pigments suitable as the first pigment include phthalocyanine pigments, perinone pigments, disazo pigments, monoazo pigments, quinoxaline pigments, and black pigments.

Phthalocyanine organic pigments include C. I. Pigment Greens 7, 36 and 37, and C. I. Pigment Blues 16, 75 and 15 (including C. I. Pigments 15:1 to 15:6). Among these, preferred are C. I. Pigment Greens 7 and 36 and C. I. Pigment Blues 15:1 to 15:6.

Perinone pigments include C. I. Pigment Orange 43 and C. I. Pigment Red 194, and C. I. Pigment Orange 43 is preferred.

Disazo organic pigments include C. I. Pigment Yellows 13, 83, 155 and 188, and C. I. Pigment Yellow 155 is preferred.

Monoazo organic pigments include C. I. Pigment Red 48, 53, 170, 187 and 247, C. I. Pigment Yellow 74, and C. I. Pigment Orange 64, and C. I. Pigment Yellow 74 is preferred.

C. I. Pigment Yellow 213 is a preferred example of quinoxaline pigments.

Black pigments include carbon black and lignin black, and carbon black is preferred.

The pigment content in the first ink is preferably in the range of 0.5% to 10% by mass. If the pigment content is less than 0.5% by mass, the print density (color developability) can be insufficient. If the pigment content is more than 10% by mass, glossiness may be degraded on a glossy medium, or problems with reliability may occur, such as nozzle clogging or unstable ejection.

Preferably, the pigment in the first ink has a volume average particle size (may be referred to as average particle size in some cases) in the range of 50 to 400 nm from the viewpoint of color developability and glossiness on glossy media. The volume average particle size can be measured with, for example, Microtrac UPA 150 (manufactured by Microtrac) or a particle size distribution analyzer LPA 3100 (manufactured by Otsuka Electronics).

Dispersant

The first and second pigments may be self-dispersing pigments or surfactant-dispersed pigments, or resin-dispersed pigments, and are, preferably, resin-dispersed pigments that are in a state of dispersion with a resin dispersant. The resin dispersant used in the resin-dispersed pigments may be a water-soluble resin or a water-insoluble resin. The term "water-insoluble resin" refers to a resin having a solubility of less than 1 g in 100 g of water at 25° C.

First Dispersant Resin

A first dispersant resin is soluble in water.

Examples of the first dispersant resin, or water-soluble resin dispersant, include polyvinyl alcohols, polyacrylic acid, acrylic acid-acrylonitrile copolymers, vinyl acetate-acrylic ester copolymers, acrylic acid-acrylic ester copolymers, styrene-(meth)acrylic acid copolymers, styrene-maleic acid copolymers, styrene-maleic anhydride copolymers, vinyl naphthalene-acrylic acid copolymers, vinyl naphthalene-maleic acid copolymers, vinyl acetate-maleic ester copolymers, vinyl acetate-crotonic acid copolymers and vinyl acetate-acrylic acid copolymers, and salts of these polymers. Among these, preferred are copolymers of a monomer having a hydrophobic functional group and a monomer having a hydrophilic functional group, and polymers formed of a monomer having both a hydrophobic functional group and a hydrophilic functional group. If a copolymer is used, the copolymer may be a random copolymer, a block copolymer, an alternating copolymer, or a graft copolymer. Styrene-(meth)acrylic acid copolymers are preferred whose structural skeleton includes a styrene skeleton and a (meth)acrylic acid skeleton.

The above-mentioned salts used as the resin dispersant may be formed with a basic compound, such as ammonia, ethylamine, diethylamine, triethylamine, propylamine, isopropylamine, dipropylamine, butylamine, isobutylamine, diethanolamine, triethanolamine, triisopropanolamine, aminomethylpropanol, or morpholine. The amount of the basic compound added is not limited as long as it is equal to or more than the neutralization equivalent of the resin dispersant.

Preferably, the first dispersant resin has a molecular weight (weight average molecular weight) in the range of 1,000 to 100,000, more preferably in the range of 3,000 to 20,000. A resin dispersant having a molecular weight in these ranges allows the pigment to be stably dispersed in water, and facilitates the control of the viscosity of the resulting ink.

Preferably, the first dispersant resin has an acid value in the range of 50 to 300, more preferably in the range of 70 to 150. A resin dispersant having an acid value in these ranges ensures that the pigment is stably dispersed in water, and recorded articles produced by recording with an ink containing such a resin dispersant have high water fastness.

Second Dispersant Resin

A second dispersant resin is not soluble in water. The second dispersant resin, or a water-insoluble resin dispersant, may be, but is not limited to, either of the following two types.

One of the two types is a block copolymer formed of a monomer having a hydrophobic group and a monomer having a hydrophilic group, and the block copolymer includes a monomer having a group capable of forming a salt.

Examples of the monomer having a hydrophobic group include methacrylic acid esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanides, such as acrylonitrile and methacrylonitrile; and aromatic vinyl monomers, such as styrene, α-methylstyrene, vinyltoluene, 4-t-butylstyrene, chlorostyrene, vinyl anisole, and vinylnaphthalene. These monomers may be used singly or in combination.

Examples of the monomer having a hydrophilic group include polyethylene glycol monomethacrylate, polypropylene glycol monomethacrylate, and ethylene glycol-propylene glycol monomethacrylate. These monomers may be used singly or in combination. In particular, monomers that can form a branched chain are preferably used from the viewpoint of enhancing the glossiness of printed images. Such monomers include polyethylene glycol (2 to 30) monomethacrylates, polyethylene glycol (1 to 15) propylene glycol (1 to 15) monomethacrylates, polypropylene glycol (2 to 30) methacrylates, methoxy polyethylene glycol (2 to 30) methacrylates, methoxy polytetramethylene glycol (2 to 30) methacrylates, and methoxy (ethylene glycol-propylene glycol copolymer) (1 to 30) methacrylates.

Examples of the monomer having a group capable of forming a salt include acrylic acid, methacrylic acid, styrene-carboxylic acid, and maleic acid. These monomers may be used singly or in combination.

In addition, macromonomers and other monomers, such as styrene-based or silicone-based macromonomers having a polymerizable functional group at one end, and may be used in combination.

The second of the two type is a water-insoluble resin having a hydrophilic structural unit (a) and a hydrophobic structural unit (b). Any monomer derived from a monomer having a hydrophilic group is used for forming hydrophilic structural unit (a) without particular limitation, and hydrophilic structural unit (a) may be derived from a single monomer having a hydrophilic group or may be derived from two or more monomers having hydrophilic groups. The hydrophilic group may be, but is not limited to, a dissociative hydrophilic group or a nonionic hydrophilic group.

A dissociative group and/or a nonionic hydrophilic group may be introduced to these water-insoluble resins, using a monomer having a dissociative group (dissociative group-including monomer) and/or a monomer having a nonionic hydrophilic group.

Preferably, the hydrophilic group is dissociative from the viewpoint of the stability of emulsion or dispersion of the pigment. Examples of the dissociative group include carboxy, phosphate and sulfonate groups. From the viewpoint of dispersion stability of the resulting ink, carboxy is preferred.

The monomer having a hydrophilic group preferably has a dissociative group, and more preferably has a dissociative group and an ethylenic unsaturated bond. Monomers having a dissociative group include unsaturated carboxylic monomers, unsaturated sulfonic monomers, and unsaturated phosphoric monomers.

Hydrophobic structural unit (b) preferably includes a structural unit having an aromatic ring bound to an atom of the main chain with a linking group therebetween. Since in this structural unit having such an aromatic ring, the aromatic ring binds to an atom of the main chain of the water-insoluble resin with the linking group therebetween without directly binding to the atom of the main chain, an appropriate distance can be maintained between the hydrophobic aromatic ring and the hydrophilic structural unit. Consequently, the water-insoluble resin and the pigment are likely to adsorb tightly with each other by their interaction, so that the dispersibility of the pigment can be further increased.

JP-A-2011-162692 describes an example of the monomers of the second type.

Preferably, the second dispersant resin has a molecular weight (weight average molecular weight) in the range of 1,000 to 200,000, more preferably in the range of 3,000 to 150,000. A resin dispersant having a molecular weight in these ranges allows the pigment to be stably dispersed in water, and facilitates the control of the viscosity of the resulting ink.

Preferably, the second dispersant resin has an acid value of about 30 or more, and more preferably in the range of 50 to 250. A resin dispersant having an acid value in these ranges ensures that the pigment is stably dispersed in water, and recorded articles produced by recording with an ink containing such a resin dispersant have high water fastness.

The first and the second dispersant resin are preferably styrene-(meth)acrylic acid copolymers.

Glycol Ether

The first ink contains a glycol ether having an HLB value, measured by Davies method, in the range of 4.2 to 8.0. By adding a glycol ether having an HLB value in this range, the wettability and penetration of the ink can be controlled independent of what type of recording medium is used. Consequently, clear images having reduced non-uniformity in density can be recorded on various types of recording medium, particularly on ink-non-absorbent or ink-low-absorbent recording media.

The HLB value of glycol ether used herein refers to a value representing the hydrophilicity of a compound, proposed by Davies et al., and it can be obtained by, for example, Davies method defined in J. T. Davies and E. K. Rideal, Interface Phenomena, 2nd ed., Academic Press, New York, 1963, and is calculated from the following equation:

$$\text{HLB value} = 7 + \Sigma[1] + \Sigma[2]$$

where [1] represents a number of hydrophilic groups, and [2] represents a number of hydrophobic groups.

Table 1 shows the numbers of typical hydrophilic groups and hydrophobic groups.

TABLE 1

| Structure | Number of groups |
|---|---|
| —CH$_2$— | −0.475 |
| —CH$_3$ | −0.475 |
| —(CH$_2$—CH$_2$O)— | +0.330 |
| —(CHCH$_2$O)—<br>\|<br>CH$_3$ | −0.150 |
| —OH | +1.900 |

The glycol ether in the first ink has an HLB value, measured by Davies method, in the range of 4.2 to 8.0, preferably in the range of 5.8 to 8.0. When the HLB value of the glycol ether is less than 4.2, the hydrophobicity of the glycol ether is increased. Hence, the affinity of the glycol ether to water, or the main solvent of the ink, is reduced, and accordingly, the storage stability of the ink can be reduced. When the HLB value is larger than 8.0, the wettability and penetration of the ink are reduced. Consequently, non-uniformity in density of images may become conspicuous. In particular, the wettability of the ink of the present embodiment to ink-non-absorbent or ink-low-absorbent recording media, which have hydrophobic surfaces, tends to be significantly reduced.

Examples of the glycol ether used in the first ink include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These glycol ethers may be used singly or in combination.

Preferably, the alkyl group of the glycol ether has a branched structure. An ink containing a glycol ether whose alkyl group has a branched structure can form clear images having little non-uniformity in density on ink-non-absorbent or ink-low-absorbent recording media. Examples of such a glycol ether include ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether.

Preferred alkyl groups having a branched structure include 2-methylpentyl, 2-ethylpentyl and 2-ethylhexyl groups from the viewpoint of enhancing the color developability, and the 2-ethylhexyl group is particularly preferred. More specifically, examples of the glycol ether having such an alkyl group include ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether. Among these, preferred are ethylene glycol mono-2-ethylhexyl ether, diethylene glycol mono-2-ethylhexyl ether, and triethylene glycol mono-2-ethylhexyl ether.

The glycol ether content in the first ink is preferably in the range of 0.05% to 6% by mass relative to the total mass of the ink, from the viewpoint of enhancing the wettability and penetration of the ink to the recording medium to reduce the non-uniformity in density, or ensuring the storage stability and reliable ejection of the ink. If the glycol ether content is less than 0.05% by mass, the wettability and penetration of the ink are reduced and the ink cannot dry rapidly. Consequently, it becomes difficult to print clear images, and the density (color developability) of the images may not be satisfactory. If the glycol ether content is higher than 6% by mass, the viscosity of the ink is increased. This causes clogging of the head. Also, since such an amount of glycol ether does not dissolve completely in the ink, the storage stability of the ink may be poor. A water-insoluble glycol ether is effective, and its content is preferably in the range of 0.1% to 2% by mass relative to the total mass of the ink.

1,2-Alkanediol Having Carbon Number of 4 to 7

The first ink may further contain 1,2-alkanediol having a carbon number of 4 to 7 as a water-soluble organic solvent compatible with the glycol ether.

The word "compatible" used herein implies that a mixture containing a 1,2-alkanediol and the glycol ether in a proportion is completely dissolved in an ink containing water as a main solvent.

By adding an 1,2-alkanediol to the first ink, the solubility of the glycol ether in the ink can be increased, and accordingly, the storage stability and ejection stability of the ink can be enhanced. In addition, since the presence of 1,2-alkanediol allow the increase of the glycol ether content in the first ink, the printing quality can be further increased.

Examples of the 1,2-alkanediol having a carbon number of 4 to 7 include 1,2-butanediol, 1,2-pentanediol, 1,2-hexanediol, 1,2-heptanediol, 1,2-octanediol, and 4-methyl-1,2-pentanediol. From the viewpoint of the solubility in water and the compatibility with the glycol ether, 1,2-hexanediol and 1,2-heptanediol, which have a carbon number of 6 or 7, are particularly preferred. The mass ratio of the 1,2-alkanediol to the glycol ether is preferably larger than 1/1 and 20/1 or less, more preferably in the range of 2/1 to 16/1, still more preferably in the range of 4/1 to 16/1, from the view point of the compatibility with the glycol ether.

Also, the 1,2-alkanediol content in the first ink is preferably in the range of 1% to 20% by mass from the viewpoint of the compatibility with the glycol ether, and the storage stability and ejection stability of the ink. If the 1,2-alkanediol content is less than 1% by mass, the compatibility between the 1,2-alkanediol and the glycol ether may not function advantageously. If the 1,2-alkanediol content is larger than 20% by mass, the viscosity of the ink is increased. Consequently, the ink is likely to be hard to discharge, and to be difficult to store for a long time.

Surfactant

Preferably, the first ink contains a surfactant selected from the group consisting of polyether siloxane-based surfactants and fluorochemical surfactants.

Polyether Siloxane-Based Surfactant

The polyether siloxane-based surfactant is not particularly limited, and can be such that the solution containing 20% by mass of glycerol, 10% by mass of 1,2-hexanediol, 0.1% by mass of the polyether siloxane-based surfactant and 69.9% by mass of water has a dynamic surface tension of 26 mN/m or less at 1 Hz. The dynamic surface tension can be measured with a bubble pressure dynamic surface tension meter BP2 (manufactured by KRUS).

A commercially available polyether siloxane-based surfactant may be used, such as Olfine PD-501 or Olfine PD-570 (each produced by Nissin Chemical Industry), or BYK-347 or BYK-348 (each produced by BYK).

Preferably, the polyether siloxane-based surfactant is expressed by the following General Formula (1) or (2). In General Formula (1), $R^1$ to $R^7$ each represent any one of C1-C6 alkyl groups, and preferably a methyl group. Also, j and k each represent an integer of 1 or greater, preferably in the range of 1 to 5, more preferably 1 to 4, still more preferably 1 or 2, and preferably satisfy j=k=1 or k=j+1. g Represents an integer of 0 or greater, preferably in the range of 1 to 3, and more preferably 1. p And q are each an integer of 0 or greater, preferably in the range of 1 to 5. Also, p+q is an integer of 1 or greater, preferably in the range of 2 to 4.

In the polyether siloxane-based surfactant expressed by General Formula (1), preferably, $R^1$ to $R^7$ all represent the methyl group, j represents 1 or 2, k represents 1 or 2, g represents 1 or 2, p represents an integer in the range of 1 to 5, and q represents 0.

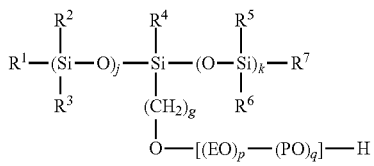

(1)

Alternatively, the polyether siloxane-based surfactant may be one or more of the compounds expressed by the following General Formula (2), or one or more compound expressed by General Formula (2) in which R represents hydrogen or a methyl group, a represents an integer of 9 to 13, m represents an integer of 2 to 4, and n represents an integer of 1 or 2.

Preferably, in General Formula (2), R is hydrogen or a methyl group, a is an integer of 6 to 18, m is 0, and n is 1. More preferably, R is hydrogen, a is an integer of 2 to 5, m is an integer of 20 to 40, and n is an integer of 3 to 5. By using such a specific polyether siloxane-based surfactant, beading and bleeding of the ink can be reduced even on a non-absorbent or low-absorbent recording medium, or on a book printing paper:

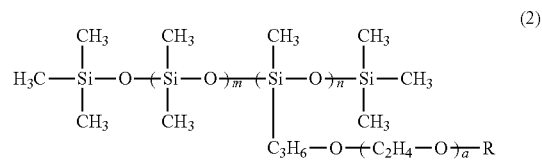

(2)

where R represents hydrogen or a methyl group, a represents an integer of 6 to 18, m represents an integer of 30 to 50, and n represents an integer of 3 to 5.

When R in General Formula (2) is a methyl group, bleeding of the ink can be further reduced. Also, by using a compound of General Formula (2) in which R is hydrogen and a compound of General Formula (2) in which R is a methyl group in combination, bleeding of the ink can further be reduced. In this instance, the content of the surfactant of General Formula (2) in which R is a methyl group is preferably 0.01% to 1.0% by mass, more preferably 0.05% to 0.70% by mass.

By appropriately controlling the proportion of the compound of General Formula (2) in which R is a methyl group to the compound of General Formula (2) in which R is hydrogen, high-quality images can be formed without bleeding or beading, and such a surfactant can be an effective adjustment agent when the fluidity of the ink varies depending on the type of the pigment or the resin content.

Fluorochemical Surfactant

The first ink may contain a fluorochemical surfactant in combination with the glycol ether. Fluorochemical surfactants are known as solvents that enhance the wettability of the ink to low-absorbent or non-absorbent recording media, as described in International Publication No. 2010/050618 and International Publication No. 2011/007888, and are therefore preferably used in embodiments of the invention. The fluorochemical surfactant can be appropriately selected according to the application without particular limitation, and examples of the fluorochemical surfactant include perfluoroalkylsulfonates, perfluoroalkylcarboxylates, perfluoroalkylphosphoric acid esters, perfluoroalkylethylene oxide adducts, perfluoroalkylbetaines, and perfluoroalkylamine oxide compounds. Among these, compounds expressed by the following General Formulas (3) to (8) are preferred from the viewpoint of reliability, and the compounds expressed by General Formulas (3), (4), (5) and (8) are more preferred.

(3)

In General Formula (3), m represents an integer of 0 to 10, and n represents an integer of 0 to 40.

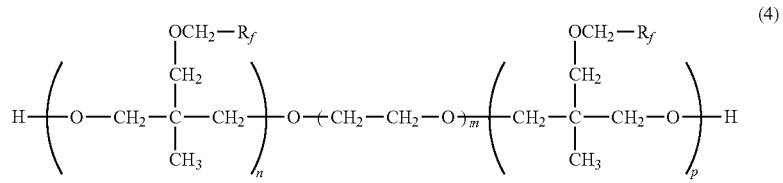

(4)

In General Formula (4), $R_f$ represents a group containing fluorine, such as $CF_3$, $CF_2$ or $CF_3$. Also, m represents an integer of 6 to 25, n represents an integer of 1 to 4, and p represents an integer of 1 to 4.

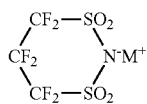 (5)

In General Formula (5), $M^+$ represents any one of $Li^+$, $Na^+$, $K^+$, and $NH_4^+$.

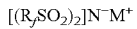 (6)

In General Formula (6), $R_f$ represents any one of $CF_3$, $C_2F_5$, $C_3F_7$ and $C_4F_9$, and $M^+$ represents any one of $Li^+$, $Na^+$, $K^+$ and $NH_4^+$.

 (7)

In General Formula (7), $R_f$ represents any one of $CF_3$, $C_2F_5$, $C_3F_7$ and $C_4F_9$, R represents an alkyl group having a carbon number of 1 to 10, and $M^+$ represents any one of $Li^+$, $Na^+$, $K^+$ and $NH_4^+$.

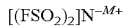 (8)

In General Formula (8), $M^+$ represents any one of $Li^+$, $Na^+$, $K^+$, and $NH_4^+$.

The fluorochemical surfactant may be synthesized in a laboratory if necessary, or may be a commercially available product. Exemplary commercially available fluorochemical surfactants include S-144 and S-145 (each produced by Asahi Glass); FC-170C, FC-430, and Novec® FC-4430 (each produced by Sumitomo 3M); FSO, FSO-100, FSN, FSN-100, FS-300 (each produced by DuPont); and FT-250 and FT-251 (each produced by Neos). Among these, DuPont surfactants such as FSO, FSO-100, FSN, FSN-100, and FS-300 are preferred from the viewpoint of high-quality printing and storage stability. The above-cited fluorochemical surfactants, which are nonionic surfactants, may be used singly or in combination.

The fluorochemical surfactant content in the ink is preferably 0.1% to 10% by mass, and more preferably 0.1% to 5% by mass. If the fluorochemical surfactant content is less than 0.1% by mass, the surfactant cannot act to enhance the penetration of the ink effectively. If the fluorochemical surfactant content exceeds 10% by mass, the viscosity of the ink is increased when the ink is stored at high temperatures. Consequently, aggregation may occur in the ink, and reliability is degraded.

Resin Particles

The first ink of the present embodiment contains polymer particles as resin particles. By adding resin particles to the first ink, images exhibiting superior rub fastness can be formed on a recording medium. For recording on an ink-non-absorbent or ink-low-absorbent recording medium made of, for example, vinyl chloride, polypropylene or polyethylene with an ink containing resin particles, the rub fastness of the resulting image is enhanced by the step of drying (second step) performed in the ink jet recording method described later. This is because the resin particles solidify the ink in the drying step (second step), so that the solidified ink can be firmly fixed to the recording medium. This function of the resin particles is enhanced by heating.

The polymer particles used in the first ink preferably have a minimum film forming temperature (MFT) or glass transition temperature (Tg) of less than 100° C. More preferably, the polymer particles have an average particle size of 350 nm or less, and still more preferably 200 nm or less.

The polymer particles may be made of a resin selected from the group consisting of polyolefin resins, acrylic resins, methacrylic resins, styrene resins, urethane resins, acrylamide resins and epoxy resins, or a mixture of these resins. Preferably, the resin is selected from the group consisting of polyolefin resins, acrylic resins, and urethane resins. If a polyolefin resin is used, ethylene-polar monomer copolymers and olefin elastomers are preferred. The resin may be a homopolymer or a copolymer, and may have a single phase structure or a double phase structure (core shell type). Examples of the resin include ethylene-(meth)acrylic ester copolymers, such as ethylene-ethyl (meth)acrylate copolymer, ethylene-methyl (meth)acrylate copolymer, ethylene-propyl (meth)acrylate copolymer, ethylene-butyl (meth)acrylate copolymer, ethylene-hexyl (meth)acrylate copolymer, ethylene-2-hydroxyethyl (meth)acrylate copolymer, ethylene-2-hydroxypropyl (meth)acrylate copolymer, and ethylene-glycidyl (meth)acrylate copolymer; ethylene-ethylenic unsaturated acid copolymers, such as ethylene-(meth)acrylic acid copolymer, ethylene-maleic acid copolymer, ethylene-fumaric acid copolymer, and ethylene-crotonic acid copolymer; ethylene-vinyl ester copolymers, such as ethylene-vinyl acetate copolymer, ethylene-vinyl propionate copolymer, and ethylene-vinyl stearate; and polyacrylic esters and their copolymers, polymethacrylic esters and their copolymers, polyacrylonitrile and its copolymers, polycyanoacrylates, polyacrylamides, polyacrylic acid, polymethacrylic acid, polyethylene, polypropylene, polybutene, polyisobutylene, polystyrene or its copolymers, petroleum resins, chromane-indene resins, terpene resins, polyvinyl acetate and its copolymers, polyvinyl alcohol, polyvinyl acetal, polyvinyl ethers, polyvinyl chloride and its copolymers, polyvinylidene chloride, fluororesin, fluorocarbon rubbers, polyvinylcarbazole, polyvinyl pyridine, polyvinyl imidazole, polybutadiene and its copolymers, polychloroprene, polyisoprene, and natural resins. Preferably, the resin of the polymer particles has an affinity to ink-non-absorbent films made of, for example, vinyl chloride, polypropylene or polyethylene (includes a hydrophobic portion in the molecular structure) and, in addition, includes a highly adhesive hydrophilic portion. For example, ethylene-vinyl ester copolymers and ethylene-(meth)acrylic ester copolymers are preferred, and ethylene-vinyl acetate copolymers are more preferred.

If acrylic resin is used, styrene-(meth)acrylic acid copolymers are preferred.

In particular, ethylene-vinyl acetate polymer particles emulsified by emulsion polymerization of a mixture containing about 8% to 35% by mass of ethylene monomer in vinyl acetate monomer under high pressure is highly resistant to water, weather and alkali, and, in addition, enhances the adhesion of the ink to polyolefin films, such as polypropylene films and polyethylene films, and the rub fastness of recorded images. In the ethylene-vinyl acetate copolymer, the vinyl acetate content is preferably 8% to 35% by mass, more preferably 12% to 30% by mass, from the viewpoint of properties of the ink, such as adhesion to recording media, rub fastness, and water fastness.

Preferably, the polymer particles have an average particle size of 350 nm or less, more preferably in the range of 30 nm to 350 nm, still more preferably in the range of 200 nm to 350 nm.

In addition, the polymer particles preferably have an MFT or Tg of less than 100° C., more preferably in the range of 0° C. to 90° C. It is preferable that at least one type of the polymer particles used in the first ink has such properties. If polymer particles having an MFT or Tg of 100° C. or more are used, the drying step (second step), which will be described later, might have to be performed at a heating temperature of 100° C. or more. Such a heating temperature however shrinks or expands the recording medium and thus causes a wrinkle in the printed image. The component having an MFT or Tg of 0° C. or more contained in an ink is effective in forming a strong resin coating in the drying step (second step). Consequently, the rub fastness of the recorded image is further enhanced. In addition, such polymer particles make it difficult that the ink clogs nozzle tips of the ink jet recording head. In contrast, if polymer particles containing a component having an MFT or Tg of less than 0° C. are used, it becomes difficult to form a strong resin coating in the drying step (second step), and consequently, the recorded image may exhibit unsatisfactory rub fastness. Furthermore, the ink is likely to solidify at the nozzle tips, thus clogging the nozzles.

The total content of the polymer particles in a solid basis is preferably 0.5% to 10% by mass relative to the total mass of the ink. When the polymer particle content is in this range, the first ink can be solidified on and fixed to various types of recording media, particularly on ink-non-absorbent or ink-low-absorbent recording media, by a suitable ink jet recording method including the drying step (second step) described below.

Any type of the polymer particles used in the first ink is preferably in the state of an emulsion or a suspension. The viscosity of an ink containing resin particles in such a state is easy to adjust in a range suitable for ink jet recording method, and the ink can be stably stored and stably ejected.

Water

The first ink contains water. Water can be the main solvent in the ink, and will be diffused and evaporated in the drying step (second step) described later. Preferably, the water is pure water or ultra-pure water from which ionic impurities have been removed as much as possible. Examples of such water include ion exchanged water, ultrafiltered water, reverse osmosis water, and distilled water. Preferably, sterile water prepared by, for example, UV irradiation or addition of hydrogen peroxide is used. The use of sterile water can prevent, for a long time, the occurrence of mold or bacteria in the pigment dispersion and the ink containing the pigment dispersion.

Other Additives

In order to enhance the performance of the ink, the first ink may further contain other components as needed, such as a penetrating solvent, a moisturizing agent, a preservative or fungicide, a pH adjuster, and a chelating agent.

Properties of First Ink

The first ink is preferably neutral or alkaline, and more preferably has a pH in the range of 7.0 to 10.0. An acid ink may be inferior in storage stability and dispersion stability. In addition, an acid ink is likely to corrode metal portions of the ink flow channel in the ink jet recording apparatus. The pH of the ink can be adjusted to be neutral or alkaline with a pH adjuster.

The viscosity of the first ink is preferably in the range of 1.5 to 15 mPa·s, more preferably in the range of 1.5 to 10 mPa·s, and still more preferably in the range of 1.5 to 8 mPa·s, at a share rate of 200 (1/s). The first ink having a viscosity in these ranges can be stably ejected in a first step described later.

The surface tension of the first ink is preferably 15 to 40 mN/m, more preferably 20 to 30 mN/m, at 25° C. The first ink having a surface tension in these ranges can be stably ejected in the below-described first step, and can exhibit appropriate wettability to ink-non-absorbent or ink-low-absorbent recording media.

2. Second Ink

The second ink of an embodiment of the invention contains a second pigment and water, but does not substantially contain the above-described glycol ether.

Second Pigment

The second pigment used in the second ink may be selected from the pigments cited above that can be used as the first pigment, or may be a pigment whose affinity with the glycol ether is lower than the affinity of the first pigment. Preferred examples of the second pigment include benzimidazolone pigments, quinacridone pigments and titanium-based pigments. Titanium-based pigments, which are used in white inks, are mainly used for forming a white area or the like having a high hiding power, thus being used for a different purpose. If the wettability of the white ink to recording media is excessively high, it is difficult to form a white area having a sufficient hiding power. This is one of the reasons why glycol ether is not added to the second ink.

Exemplary benzimidazolone pigments include C. I. Pigment Yellows 151, 154, 175, 180 and 181, and C. I. Pigment Oranges 36 and 72, and C. I. Pigment Yellow 180 is preferred.

Exemplary quinacridone pigments include quinacridone solid solution pigments, C. I. Pigment Reds 49, 122, 202 and 209, C. I. Pigment Violet 19, C. I. Pigment Orange 48, and quinacridone solid solution pigments, C. I. Pigment Red 122 and C. I. Pigment Violet 19 are preferred. Quinacridone solid solution pigments include are preferably solid solutions of two or more pigments selected from among C. I. Pigment Reds 122, 202 and 209 and C. I. Pigment Violet 19, and a solid solution of C. I. Pigment Red 202 and C. I. Pigment Violet 19 is more preferred.

Preferred titanium-based pigments include C. I. Pigment Whites 6 and 6:1.

The pigment content in the second ink is preferably in the range of 0.5% to 15% by mass. If the pigment content is less than 0.5% by mass, the print density (color developability) can be insufficient. If the pigment content is more than 15% by mass, glossiness may be degraded on a glossy medium, or problems with reliability may occur, such as nozzle clogging or unstable ejection.

Glycol Ether

The second ink of the present embodiment does not substantially contain a glycol ether having an HLB, measured by Davies method, of 4.2 to 8.0. The affinity to the glycol ether of the pigment contained in the second ink is rather poor, and it is therefore undesirable to add a large amount of the glycol ether to the second ink. If a large amount of the glycol ether is added, the dispersion of the ink can be corrupted, and aggregation or increase in viscosity may occur.

The phrase "substantially not contain" suggests that the glycol ether may be contained to the extent that the glycol ether does not sufficiently function as intended. For example, the phrase "substantially not contain the glycol ether" implies that the ink does not contain the glycol ether in an amount of 0.1% by mass or more, preferably 0.01% by mass or more, more preferably 0.001% by mass or more, and still more preferably 0.0001% by mass or more.

Surfactant

The second ink preferably contains one or more surfactants selected from among the polyether siloxane-based surfactants and fluorochemical surfactants cited in the description of the first ink. This is because since the second ink does not substantially contain the above-described glycol ether, it is preferable that any other material for enhancing the wettability be added. If a polyether siloxane-based surfactant is added, a compound expressed by General Formula (2) in which R represents a methyl group is preferred.

As with the first ink, the second ink also contains a 1,2-alkanediol having a carbon number of 4 to 7, resin particles, and other additives, and the properties of the second ink are the same as those of the first ink.

3. Others

Relationship Between First Ink and Second Ink

When both the first ink and the second ink contain a polyether siloxane-based surfactant or a fluorochemical surfactant, the content of the polyether siloxane-base surfactant or the fluorochemical surfactant in the second ink is preferably higher than that in the first ink. This is because since the second ink does not substantially contain the above-described glycol ether that can impart satisfactory wettability, it is preferably that any other surfactant be added to enhance the wettability.

The 1,2-alkanediol content in the first ink is preferably higher than that in the second ink. The glycol ether in the first ink tends to be insoluble in water. It is therefore preferable that a larger amount of 1,2-alkanediol be added to the first ink than the second ink so as to help the dissolution of the glycol ether.

Heating

The ink set of the present embodiment is preferably applied to heated recording media. This will be described later. If an ink-non-absorbent or ink-low absorbent recording medium is used, it is important that the inks can dry rapidly. Accordingly, it is desirable that a heating mechanism be used.

4. Recording Medium

The ink set according to embodiments of the invention may be applied to any recording medium, and the recording medium can be selected as desired. The ink set is advantageously used when recording is performed on ink-non-absorbent or ink-low-absorbent media by an ink jet recording technique. The ink-non-absorbent and ink-low-absorbent recording media used herein refer to recording media that can absorb water in an amount of 10 mL/m$^2$ or less for a period of 30 ms$^{1/2}$ from the beginning of contact with water when the water absorption is measured by Bristow's method. Bristow's method is broadly used as a method for measuring liquid absorption for a short time, and Japan Technical Association of the Pulp and Paper Industry (JAPAN TAPPI) has officially adopted this method. Details of this method are specified in Standard No. 51 (Paper and Paperboard—Liquid absorption Test Method—Bristow's Method (in Japanese)) of JAPAN TAPPI Paper and Pulp Test Methods edited in 2000 (in Japanese).

The ink-non-absorbent recording medium may be a plastic film not surface-treated for ink jet printing (not having an ink-absorbing layer), or a paper sheet or any other medium coated or bonded with a plastic film. The plastic here may be polyvinyl chloride, polyethylene terephthalate, polycarbonate, polystyrene, polyurethane, polyethylene, or polypropylene. The ink-low-absorbent recording medium may be a book printing paper, such as art paper, coated paper, or matte paper. The ink-absorbent recording medium may be high-quality paper, plain paper, or recycled paper.

5. Ink Jet Recording Method

An ink jet recording method according to an embodiment of the invention uses the ink set of an embodiment of the invention. The method includes the first step of forming an image on a recording medium by ejecting any ink of the ink set, and the second step of drying the ink on the recording medium at least either during or after the first step. The steps of the method will now be described in detail.

First Step

In the first step of the ink jet recording method of the present embodiment, an image is formed on a recording medium by ejecting any ink of the ink set using an ink jet recording technique.

Any ink jet recording technique may be applied as long as droplets of the ink are deposited on the recording medium by ejecting the ink from a fine nozzle. Exemplary ink jet techniques include the following four.

A first technique is electrostatic suction. In this technique, a strong electric field is applied between the nozzle and an acceleration electrode disposed in front of the nozzle. Droplets of an ink are continuously ejected from the nozzle, and a printing information signal is applied to deflecting electrodes while the ink droplets fly between the deflecting electrodes, so that recording is performed. Ink droplets may be ejected according to printing information signals without deflecting the ink droplets.

A second technique is a method for forcibly ejecting ink droplets by applying a pressure to the ink with a small pump, and mechanically vibrating the nozzle with a quartz resonator. The ejected ink droplets are charged simultaneously with the ejection of the ink, and recording is performed by applying printing information signals to deflecting electrodes while the ink droplets fly between the deflecting electrodes.

A third technique uses a piezoelectric element. A pressure and printing information signals are simultaneously applied to the ink with the piezoelectric element, thereby ejecting ink droplets for recording.

In a fourth technique, the volume of the ink may be rapidly expanded by thermal energy. The ink is bubbled by heating with a small electrode according to printing information signals, and is thus ejected for recording.

Second Step

In the second step of the ink jet recording method, the ink on the recording medium is dried at least either during or after the first step. By performing the second step, part or the entire of the liquid medium of the ink is rapidly evaporated and diffused to form a coating of polymer particles. Consequently, high-quality images not exhibiting non-uniform density can be formed in a short time even on an ink-non-absorbent recording medium, such as a plastic film not having an ink absorbing layer, and the resin coating formed by drying the ink adheres to the recording medium to fix the images.

Any technique can be used for performing the second step without particular limitation, as long as it can accelerate the evaporation of the liquid medium of the ink. For example, the recording medium may be heated at least either during or after the first step. Air may be blown to the ink on the recording medium after the first step. These techniques may be combined. More specifically, preferred drying techniques include forcible air heating, heat radiation, conduction heating, high-frequency drying and microwave drying.

If heat is applied in the second step, temperature is not particularly limited as long as it is such that the evaporation and diffusion of the liquid medium of the ink can be accelerated. For example, the temperature is 40° C. or more, preferably in the range of 40° C. to 130° C., and more preferably in the range of 40° C. to 110° C. The "temperature" in this instance is that of the surface of the recording medium with which the ink comes into contact.

The heating time is also not particularly limited as long as the liquid medium of the ink is evaporated and diffused and the polymer particles form a coating. The heating time can be appropriately set in view of the type of the liquid medium, the type of resin particles, and printing speed.

EXAMPLES

The invention will be further described in detail with reference to Examples. The invention is not however limited to the examples.

Preparation of Pigment Dispersions

Pigment dispersions each containing a pigment whose particles are coated with a first dispersant resin, which is a water-insoluble polymer, or a pigment whose particles are coated with a second dispersant resin, which is a water-insoluble polymer, were prepared as below.

Pigment Dispersions Prepared Using First Dispersant Resin

A yellow pigment, a magenta pigment, a cyan pigment, an orange pigment, a green pigment, a white pigment, and a black pigment were each dispersed as below. A water-soluble resin solution was prepared by dissolving 40 parts of a first dispersant resin (copolymerization product of water-soluble resins: methacrylic acid, butyl acrylate, styrene and hydroxyethyl acrylate in a mass ratio of 25:50:15:10, weight average molecular weight: 12,000) in 30 parts of a mixture containing 7 parts of potassium hydroxide, 23 parts of water, and 30 parts of triethylene glycol mono-n-butyl ether with stirring and heating at 80° C. To 1.75 kg of the water-soluble resin solution (solid content: 43%) were added 3.0 kg of pigment, 1.5 kg of ethylene glycol, and 8.75 kg of water. The materials were subjected to pre-mixing by being agitated with a mixing machine. The pigment mixture was dispersed by a multipulse technique in a bead mill having an effective volume of 1.5 L, equipped with a multi-disk impeller, and 85% charged with 0.5 mm zirconia beads. More specifically, the dispersion was performed two passes at a bead peripheral speed of 8 m/s and a discharge rate of 30 L/h, and thus a pigment-dispersed mixture was prepared. Subsequently, the pigment-dispersed mixture was subjected to circulation dispersion in an annular bead mill having an effective volume of 1.5 L and 95% charged with 0.05 mm zirconia beads. More specifically, 10 kg of the pigment-dispersed mixture was dispersed for 4 hours, using a 0.015 mm screen, at a bead peripheral speed of 10 m/s and a circulation rate of 300 L/h. Thus, pigment dispersions containing 20% of solid pigment were prepared.

Pigment Dispersion Prepared Using Second Dispersant Resin

A black pigment was dispersed as below. A reaction vessel sufficiently purged with nitrogen gas was charged with 20 parts by weight of organic solvent (methyl ethyl ketone), 0.03 parts by weight of polymerization chain transfer agent (2-mercaptoethanol), a polymerization initiator, and monomers shown in Table 2, and polymerization was performed at 75° C. with stirring. Relative to 100 parts by weight of monomer components, 0.9 parts by weight of 2,2'-azobis-2,4-dimethylvaleronitrile dissolved in 40 parts by weight of methyl ethyl ketone was added, and the mixture was aged at 80° C. for one hour to yield a polymer solution.

TABLE 2

| Composition of monomer mixture (mass %) | |
|---|---|
| Methacrylic acid | 20 |
| Styrene monomer | 45 |
| Polyethylene glycol monomethacrylate (EO = 15) | 5 |
| Polyethylene glycol-propylene glycol monomethacrylate (EO = 5, PO = 7) | 10 |
| Styrene macromer | 20 |

The polymer solution was dried under reduced pressure, and 5 parts of the dried polymer was dissolved in 15 parts of methyl ethyl ketone, followed by being neutralized with an aqueous solution of sodium hydroxide. Then, 15 parts of C. I. Pigment Black 7 was added, and the mixture was agitated with a disperser while water was being added. After 100 parts of ion exchanged water was added to the resulting mixture and stirred, the methyl ethyl ketone was removed at 60° C. under reduced pressure, and part of the water was removed to yield a black pigment dispersion in water having a solid content of 20% by weight. In this instance, the weight ratio of the pigment to the water-insoluble polymer was 1:0.5.

Preparation of Inks

Materials were mixed according to Tables 3 and 4. After being stirred for 2 hours, the mixture was filtered through a membrane filter of 5 μm in pore size. Thus, inks were prepared. In Tables 3 and 4, the content of each material is represented by percent by mass, and number in the parentheses of each pigment dispersion represents the solid content of the pigment. The "balance" of the ion exchanged water implies that ion exchanged water was added so that the total weight would be 100 parts. PD-570 contains a surfactant expressed by General Formula (2) in which R is a methyl group, and BYK-348 contains a surfactant expressed by General Formula (2) in which R is hydrogen. Styrene-acrylic acid copolymer has a volume average particle size of 40 nm and a glass transition temperature Tg of 80° C.

TABLE 3

| | Ink of Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | 2nd ink | 2nd ink | 1st ink | 1st ink | 1st ink | 2nd ink | 2nd ink | 2nd ink | 2nd ink | 1st ink | 1st ink | 1st ink |
| C.I. Pigment Yellow 180 | 30 (5) | 30 (5) | | | | | | | | | | |
| C.I. Pigment Yellow 74 | | | 30 (5) | | | | | | | | | |
| C.I. Pigment Yellow 155 | | | | 30 (5) | | | | | | | | |
| C.I. Pigment Yellow 213 | | | | | 30 (5) | | | | | | | |
| C.I. Pigment Violet 19 + Red 202 | | | | | | 30 (5) | 30 (5) | 30 (5) | | | | |
| C.I. Pigment White 6 | | | | | | | | | 30 (5) | | | |
| C.I. Pigment Blue 15:3 | | | | | | | | | | 30 (5) | 30 (5) | 30 (5) |
| C.I. Pigment Orange 43 | | | | | | | | | | | | |
| C.I. Pigment Green 36 | | | | | | | | | | | | |
| C.I. Pigment Black 7 (First dispersant resin) | | | | | | | | | | | | |

TABLE 3-continued

| | Ink of Example | | | | | | | | | | | |
|---|---|---|---|---|---|---|---|---|---|---|---|---|
| | 1 2nd ink | 2 2nd ink | 3 1st ink | 4 1st ink | 5 1st ink | 6 2nd ink | 7 2nd ink | 8 2nd ink | 9 2nd ink | 10 1st ink | 11 1st ink | 12 1st ink |
| C.I. Pigment Black 7 (Second dispersant resin) | | | | | | | | | | | | |
| Triethylene glycol monohexyl ether (HLB = 7.0) | | | | | | | | | | 1 | | |
| Diethylene glycol mono-2-ethylhexyl ether (HLB = 5.8) | | | 1 | 1 | 1 | | | | | | 1 | |
| Ethylene glycol mono-2-ethylhexyl ether (HLB = 5.4) | | | | | | | | | | | | 1 |
| Ethylene glycol monomethyl ether (HLB = 8.8) | | | | | | | | | | | | |
| Diethylene glycol monododecyl ether (HLB = 3.8) | | | | | | | | | | | | |
| Propylene glycol | 14 | 14 | 14 | 14 | 14 | 14 | 14 | 14 | 14 | 14 | 14 | 14 |
| PD-570 (Nissin Chemical Industry) | 1.5 | | 0.5 | | 0.5 | 1.5 | | | 1.5 | 0.5 | 0.5 | 0.5 |
| BYK-348 (BYK) | | 1.5 | | 0.5 | | | 1.5 | | | | | |
| FS-300 (DuPont) | | | | | | | | 1.5 | | | | |
| 1,2-Hexanediol | 8 | 8 | 8 | 8 | 8 | 8 | 8 | 8 | 8 | 8 | 8 | 8 |
| Styrene-acrylic acid copolymer emulsion dispersion (Tg: 50° C., 50% dispersion) | 2 (1) | 2 (1) | 2 (1) | 2 (1) | 2 (1) | 2 (1) | 2 (1) | 2 (1) | 2 (1) | 2 (1) | 2 (1) | 2 (1) |
| Ion exchanged water | Balance | Balance | Balance | Balance | Balance | Balance | Balance | Balance | Balance | Balance | Balance | Balance |

TABLE 4

| | Ink of Example | | | | Ink of Comparative Example | | | | | | | | |
|---|---|---|---|---|---|---|---|---|---|---|---|---|---|
| | 13 1st ink | 14 1st ink | 15 1st ink | 16 1st ink | 1 | 2 | 3 | 4 | 5 | 6 | 7 | 8 | 9 |
| C.I. Pigment Yellow 180 | | | | | 30 (5) | | | | | | | | |
| C.I. Pigment Yellow 74 | | | | | | | | | | | | | |
| C.I. Pigment Yellow 155 | | | | | | | | | | | | | |
| C.I. Pigment Yellow 213 | | | | | | | | | | | | | |
| C.I. Pigment Violet 19 + Red 202 | | | | | | 30 (5) | 30 (5) | | | | | | |
| C.I. Pigment White 6 | | | | | | | | | | | | | |
| C.I. Pigment Blue 15:3 | | | | | | | | 30 (5) | 30 (5) | 30 (5) | | | |
| C.I. Pigment Orange 43 | 30 (5) | | | | | | | | | | 30 (5) | | |
| C.I. Pigment Green 36 | | 30 (5) | | | | | | | | | | 30 (5) | |
| C.I. Pigment Black 7 (First dispersant resin) | | | 30 (5) | | | | | | | | | | 30 (5) |
| C.I. Pigment Black 7 (Second dispersant resin) | | | | 30 (5) | | | | | | | | | |
| Triethylene glycol monohexyl ether (HLB = 7.0) | | | | | | | | | | | | | |
| Diethylene glycol mono-2-ethylhexyl ether (HLB = 5.8) | 1 | 1 | 1 | 1 | 1 | 1 | | | | | | | |
| Ethylene glycol mono-2-ethylhexyl ether (HLB = 5.4) | | | | | | | | 1 | | | | | |
| Ethylene glycol monomethyl ether (HLB = 8.8) | | | | | | | | | 1 | | | | |
| Diethylene glycol monododecyl ether (HLB = 3.8) | | | | | | | | | | 1 | | | |
| Propylene glycol | 14 | 14 | 14 | 14 | 14 | 14 | 14 | 14 | 14 | 14 | 14 | 14 | 14 |
| PD 570 (Nissin Chemical Industry) | 0.5 | | 0.5 | 0.5 | 0.5 | 0.5 | 0.5 | 0.5 | 0.5 | 1.5 | | | 1.5 |
| BYK 348 (BYK) | | 0.5 | | | | | | | | | 1.5 | | |
| FS-300 (DuPont) | | | | | | | | | | | | 1.5 | |
| 1,2-Hexanediol | 8 | 8 | 8 | 8 | 8 | 8 | 8 | 8 | 8 | 8 | 8 | 8 | 8 |

TABLE 4-continued

|  | Ink of Example | | | | Ink of Comparative Example | | | | | | | | |
|---|---|---|---|---|---|---|---|---|---|---|---|---|---|
|  | 13 | 14 | 15 | 16 | 1 | 2 | 3 | 4 | 5 | 6 | 7 | 8 | 9 |
|  | 1st ink | 1st ink | 1st ink | 1st ink | | | | | | | | | |
| Styrene-acrylic acid copolymer emulsion dispersion (Tg: 50° C., 50% dispersion) | 2 (1) | 2 (1) | 2 (1) | 2 (1) | 2 (1) | 2 (1) | 2 (1) | 2 (1) | 2 (1) | 2 (1) | 2 (1) | 2 (1) | 2 (1) |
| Ion exchanged water | Balance | Balance | Balance | Balance | Balance | Balance | Balance | Balance | Balance | Balance | Balance | Balance | Balance |

The inks prepared according to Tables 3 and 4 were each evaluated as below.

Evaluation 1: Storage Stability

Each ink was allowed to stand at 70° C. for 6 days, or at −20° C. for 4 days, and the viscosities of the ink immediately after the preparation of the ink and after the storage test were compared. Evaluation criteria were as follows:

Good: variation in viscosity was more than −5% and less than +5%.

Bad: variation in viscosity was −5% or less or +5% or more.

Evaluation 2: Printing Quality on Ink-Non-Absorbent Recording Medium

An ink jet printer PX-V600 was charged with any one of the inks. Images were printed at 360 dpi and at different solid densities varied from 5% to 100% at intervals of 5%, and the printing quality of the images (quality of solid images) was evaluated in terms of non-uniformity in density. For this evaluation, a polypropylene film (SY51M) was used as an ink-non-absorbent recording medium. Evaluation criteria were as follows:

A: The solid image was satisfactory when printing was performed at a solid color area density of 90%.

B: The solid image was satisfactory when printing was performed at a solid color area density of 100%.

C: The solid image was not satisfactory even when printing was performed at a solid color area density of 100%.

The results of the evaluations 1 and 2 are shown together in Table 5.

TABLE 5

|  |  | Ink of Example | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 |
| Evaluation 1 | Storage stability | Good | Good | Good | Good | Good | Good | Good | Good | Good | Good | Good | Good |
| Evaluation 2 | Solid color area | B | C | A | A | A | B | C | B | B | A | A | A |

|  |  | Ink of Example | | | | Ink of Comparative Example | | | | | | | | |
|---|---|---|---|---|---|---|---|---|---|---|---|---|---|---|
|  |  | 13 | 14 | 15 | 16 | 1 | 2 | 3 | 4 | 5 | 6 | 7 | 8 | 9 |
| Evaluation 1 | Storage stability | Good | Good | Good | Good | Bad | Bad | Bad | Good | Bad | Good | Good | Good | Good |
| Evaluation 2 | Solid color area | A | A | A | A | A | A | A | C | A | B | C | B | B |

As is clear from Table 5, the inks of the Examples according to the invention can form satisfactory solid images even on media that are likely to repel inks. Also, the inks exhibit high storage stability and reliability, and are thus suitable for an ink jet recording technique.

The invention is not limited to the disclosed embodiments, and can be applied to various applications, such as pens and pencils, offset printing, flexography, and gravure-printing.

What is claimed is:

1. An ink set comprising:

a first ink containing a first pigment, water, and a glycol ether having a hydrophile-lipophile balance value, measured by Davies method, in the range of 4.2 to 8.0; and a second ink substantially not containing the glycol ether, the second ink containing a second pigment and water, wherein the glycol ether is selected from the group consisting of ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether and diethylene glycol mono-2-methylpentyl ether.

2. The ink set according to claim 1, wherein the second ink further contains a surfactant selected from the group consisting of fluorochemical surfactants and polyether siloxane-based surfactants.

3. The ink set according to claim 2, wherein the first ink further contains a surfactant selected from the group consisting of fluorochemical surfactants and polyether siloxane-based surfactants.

4. The ink set according to claim 3, wherein the surfactant content in the second ink is higher than the surfactant content in the first ink.

5. The ink set according to claim 1, wherein the first ink further contains a 1,2-alkanediol having a carbon number in the range of 4 to 7 in a mass ratio of 2/1 to 16/1 to the glycol ether.

6. The ink set according to claim 1, wherein the first pigment is selected from the group consisting of phthalocyanine pigments, perinone pigments, disazo pigments, monoazo pigments, quinoxaline pigments, and black pigments.

7. The ink set according to claim 1, wherein the second pigment is selected from the group consisting of quinacridone pigments, benzimidazolone pigments, and titanium-based pigments.

* * * * *